US011575528B1

(12) United States Patent
Nandikotkur et al.

(10) Patent No.: US 11,575,528 B1
(45) Date of Patent: Feb. 7, 2023

(54) DYNAMIC VIRTUAL MEETING, ONLINE WEBINAR AND DISTANCE-BASED EDUCATION SYSTEMS AND METHODS

(71) Applicant: Citrix Systems, Inc., Fort Lauderdale, FL (US)

(72) Inventors: Achyuth Nandikotkur, Bangalore (IN); Arnav Akhoury, Bangalore (IN); Divyansh Deora, Bengaluru (IN); Satish Vanahalli, Bangalore (IN)

( * ) Notice: Subject to any disclaimer, the term of this patent is extended or adjusted under 35 U.S.C. 154(b) by 0 days.

(21) Appl. No.: 17/384,049

(22) Filed: Jul. 23, 2021

(51) Int. Cl.
*H04L 12/18* (2006.01)
*H04L 12/58* (2006.01)
*H04L 51/234* (2022.01)

(52) U.S. Cl.
CPC ...... *H04L 12/1818* (2013.01); *H04L 12/1831* (2013.01); *H04L 51/234* (2022.05)

(58) Field of Classification Search
CPC .. H04L 12/1818; H04L 12/1831; H04L 51/34
See application file for complete search history.

(56) References Cited

U.S. PATENT DOCUMENTS

| | | | | |
|---|---|---|---|---|
| 8,495,496 B2* | 7/2013 | Bastide | | G06Q 10/107 715/741 |
| 8,934,723 B2* | 1/2015 | Dwan | | G06V 20/35 382/229 |
| 11,095,804 B2* | 8/2021 | Cao | | H04N 5/23222 |
| 11,138,212 B2* | 10/2021 | Jauhari | | G06F 16/24578 |
| 2015/0317383 A1* | 11/2015 | Alkov | | G06Q 50/00 707/738 |
| 2017/0132313 A1* | 5/2017 | Kukla | | G06F 16/334 |
| 2018/0144235 A1* | 5/2018 | Ground, Jr. | | G06F 16/24522 |
| 2018/0189382 A1* | 7/2018 | Mowatt | | G06Q 30/0214 |
| 2020/0097598 A1* | 3/2020 | Anderson | | G10L 15/22 |
| 2021/0255744 A1* | 8/2021 | Sullivan | | G06F 3/04842 |

OTHER PUBLICATIONS

Image Similarity / Deep AI, 8 pages, printed Jul. 25, 2021 (https://deepai.org/machine-learning-model/image-simlarity).
Resemble.js : Image analysis and comparison, 3 pages, printed Jul. 25, 2021 (https://rsmbl.github.io/Resemble.js/).

* cited by examiner

*Primary Examiner* — Esther B. Henderson
*Assistant Examiner* — Nazia Naoreen (57) ABSTRACT

Aspects described herein may allow for grouping questions received during a virtual meeting in order to present the questions to a presenter of the virtual meeting efficiently. A system may receive, during a virtual meeting, a plurality of messages each indicative of a question. The message comprises content descriptive of the question and metadata. For example, the metadata may comprise data identifying an image corresponding to the message. The system may group the plurality of messages into one or more groups, individual messages within the groups having a context in common with one another, by analyzing text and metadata of the message. The system may send data about at least one group to a first client device for output of the questions indicated by the messages of that group on the first client device.

16 Claims, 9 Drawing Sheets

DYNAMIC VIRTUAL MEETING, ONLINE WEBINAR AND DISTANCE-BASED EDUCATION SYSTEMS AND METHODS

FIELD

Aspects described herein generally relate to computer networking and hardware and software related thereto. More specifically, one or more aspects described herein provide systems and methods for improving virtual meeting interactions and online education webinars, e.g., by providing intelligent question and query grouping.

BACKGROUND

Some virtual meetings have large numbers of participants. For example, a large webinar may have tens or hundreds of participants, e.g., students. Participants may not be allowed to ask questions during the webinar in real-time because that may cause too many interruptions to the presenter of the webinar. Instead, participants may need to post their questions by typing them into a chat window associated with the webinar. These questions may be reviewed by the presenter in the chat window so that the presenter can answer the questions in a Q&A session at the end of the webinar. However, reviewing the questions during the Q&A session may be difficult because the presented must read through each question, make sense of it, and then attempt to answer based on the typed text of the question. Therefore, systems and methods for presenting user inquiries more efficiently and easier to be understood are needed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Reviewing participants' questions during a virtual meeting may present challenges to the presenter of the meeting for at least two reasons. First, if the presenter chooses to review these questions at a later time point, the questions may be difficult to be understood because the context may be missing. Second, the process of answering these questions one by one may be inefficient because when a presenter addresses a question, he may not know what, if any, other questions should also have been addressed together.

To overcome limitations in the prior art described above, and to overcome other limitations that will be apparent upon reading and understanding the present specification, aspects described herein are directed towards dynamic interaction between a presenter and participants within a virtual meeting or webinar by, e.g., analyzing metadata associated with questions received during a virtual meeting, and presenting question topics to a presenter based on the commonality of the content of the questions.

In one or more illustrative embodiments, a computing device may receive, by a server and during a virtual meeting, a plurality of messages each indicative of a question, and wherein the message may comprise content descriptive of the question and metadata associated with the virtual meeting based on a time of the message. The computing device may group the plurality of messages into one or more groups by analyzing the content and metadata of each message, wherein individual messages within each group have a context in common with one another. The computing device may send data about at least one group to a first client device for output of the questions indicated by the messages of that group on the first client device.

In one or more instances, the metadata of each individual message may comprise one or more timestamps within the virtual meeting corresponding to when that message was started and/or sent.

In one or more instances, the metadata of one or more individual messages may comprise data identifying an image corresponding to that message. The image may represent the content being presented within the virtual meeting. Analyzing the content and metadata of the message may comprise determining a level of similarity between two or more images identified in the metadata of the plurality of messages.

In one or more instances, the metadata may comprise a transcript of a presenter during a time period comprising a time corresponding to the one or more timestamps. The computing device may obtain, a voice recording around the time with which the question message is associated and may convert, the voice recording to the transcript.

In one or more instances, the metadata may comprise a number indicative of a location of a document presented during the virtual meeting.

In one or more instances, analyzing the content and metadata of the message may comprise: extracting one or more keywords from the content and determining a level of similarity between the one or more keywords extracted from each message with one or more keywords extracted from other messages in the plurality of messages.

In one or more instances, the data about the at least one group may comprise an image representative of the context shared among different messages of the group.

In one or more instances, the computing device may further receive, from the first client device, a response to a group of messages; and may send the response to a plurality of client devices for output, wherein the plurality of client devices may comprise all client devices from which at least one of the messages within the group originated.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards dynamic interaction between a presenter and participants within a virtual meeting or webinar by, e.g., analyzing metadata associated with questions received during a virtual meeting, and presenting question topics to a presenter based on commonality of content of the questions, so that the presenter of the virtual meeting may review the questions efficiently at a later time point.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
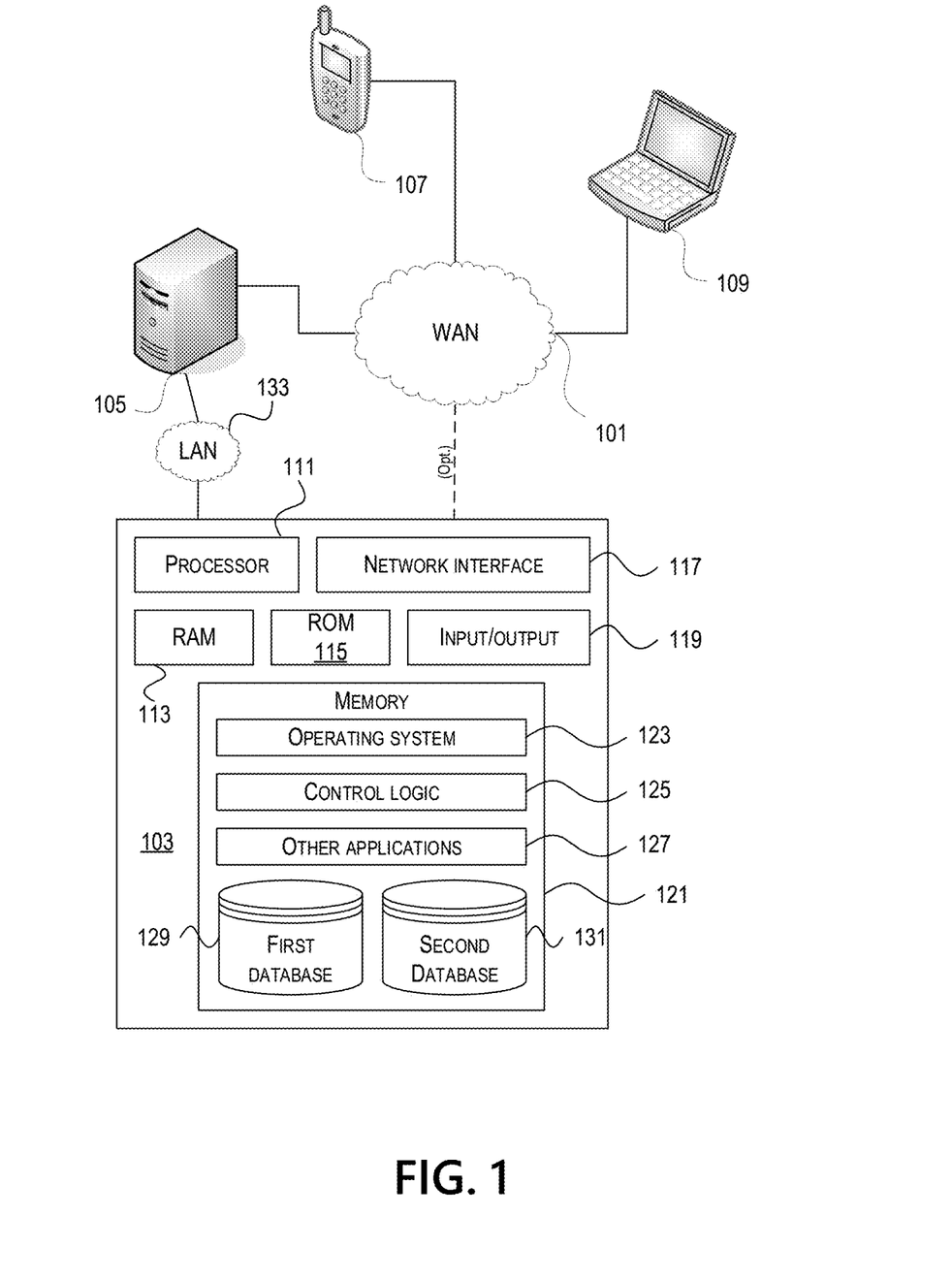
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
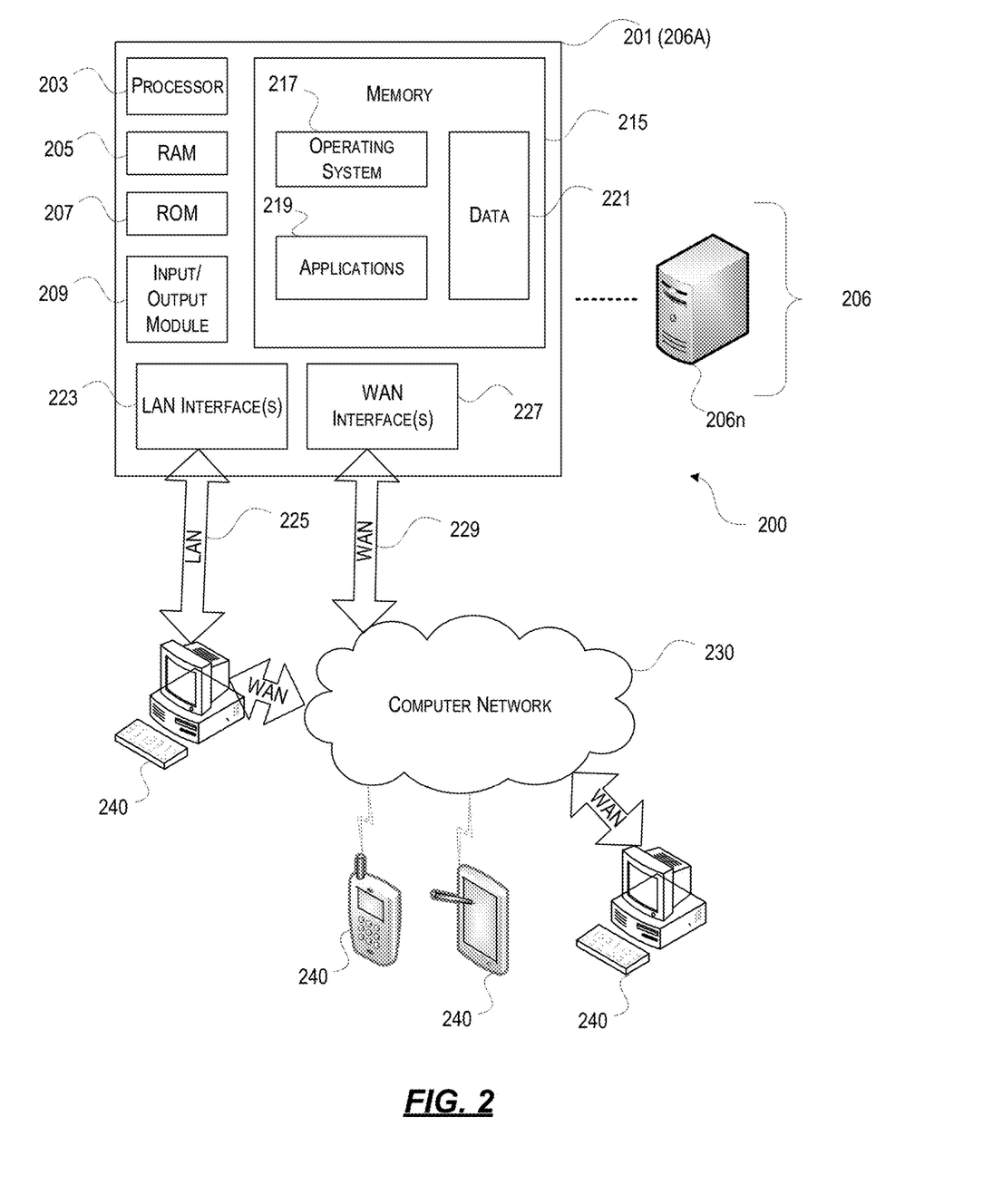
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Grouping Questions Received During a Virtual Meeting

Figure 3:
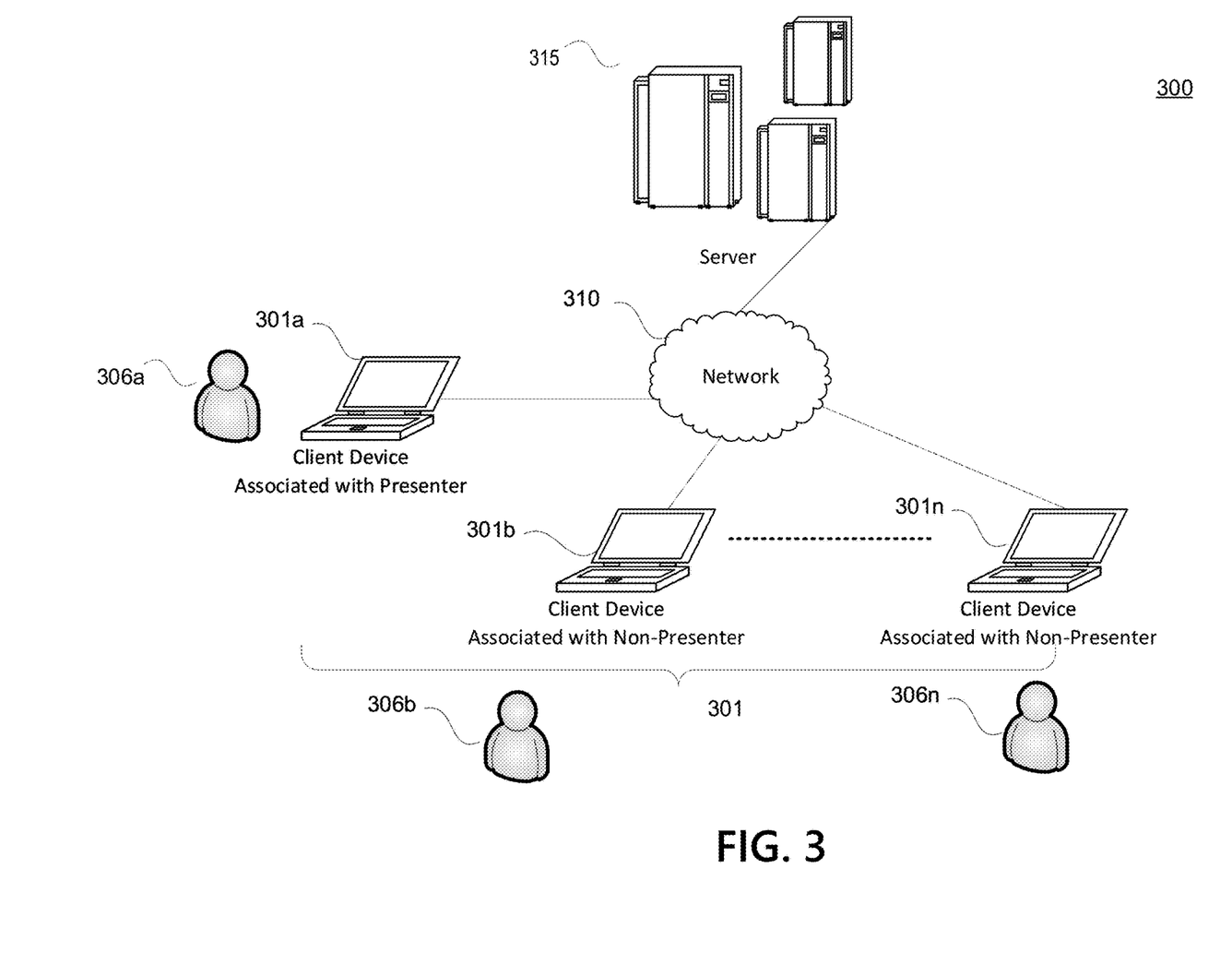
FIG. 3 depicts an illustrative computing environment for grouping questions in accordance with one or more illustrative aspects described herein.

FIG. 3 depicts an illustrative computing environment 300 in accordance with one or more example embodiments. Computing environment 300 may include a plurality of client devices 301 (e.g., client device 301a-301n). A client device 301 may be any of devices 107 or 109 (as depicted in FIG. 1), and/or client machine 240 (as depicted in FIG. 2). In some instances, the client device 301 may be configured to expose or otherwise display an interface, and communicate with one or more servers (e.g., via an API) to update the interface in response to user input received at the client device 301.

Server 315 may be a computer system that includes one or more computing devices and/or other computer components (e.g., processors, memories, communication interfaces, servers, server blades, or the like). For example, server 315 may be and/or include any of data server 103 or web server 105 (as depicted in FIG. 1), or server 206 (as depicted in FIG. 2). In addition, server 303 may be configured to support a virtual meeting that may be displayed or otherwise utilized by the client devices 301.

Computing environment 300 may also include one or more networks, which may interconnect client devices 301 and server 315. For example, computing environment 300 may include a network 310 (which may e.g., interconnect client devices 301 and server 303).

In one or more arrangements, client devices 301, server 315, and/or the other systems included in computing environment 300 may be any type of computing device capable of receiving a user interface, receiving input via the user interface, and communicating the received input to one or more other computing devices. For example, client devices 301, server 303, and/or the other systems included in computing environment 300 may in some instances, be and/or include server computers, desktop computers, laptop computers, tablet computers, smartphones, or the like that may include one or more processors, memories, communication interfaces, storage devices, and/or other components. As noted above, any and/or all of the client devices 301 and/or server 315 may, in some instances, be special-purpose computing devices configured to perform specific functions.

A client device 301 may be used by a user 306 to attend a virtual meeting (e.g., a webinar). The client device 301 may send upstream data to facilitate the user 306's interaction with other participants in the virtual meeting. For example, the client device 301 may send to the server 315 video data captured from a camera communicating with the client device 301, or audio data captured from a microphone communicating the client device 301. The client device 301 may also send other data that the user 306 wants to be presented in the virtual meeting. For example, the user 306 may present the screen display of the client device 301. The type of data a user 306 may be allowed to present in a virtual meeting may depend on the role of user 306 in the meeting. One or more users 306a may be presenters (e.g., a professor holding a lecture), and the other one or more users 306b-306n may be non-presenters 306b-306n (e.g., students attending the lecture). A presenter 306a may be allowed to present at least a portion of the screen display on his or her client device 301a, while a non-presenter 306b-306n may not be allowed to present their screen display. For example, a presenter 306a may present, via the client device 301a, a document (e.g., a PowerPoint™ document) to the non-presenters 306b-306n. A present 306a may be allowed to present a live video taken from a camera associated with the client device 301a of the presenter 306a, while a non-presenter 306b-306n may or may not be allowed to present a live video.

The content of the virtual meeting may be displayed on a graphical user interface (hereinafter "GUI") (e.g., a web browser) on the client device 301. An interaction menu associated with the virtual meeting may also be displayed on a GUI of the client device 301. The client devices 301a associated with presenters 301a may display an interaction menu different from the interaction menus displayed on the client devices 301b-301n associated non-presenters 306b-306n. For example, as described in greater detail below in FIGS. 6A-6B, the client devices 301b-301n associated with non-presenters 306b-306n may display an interaction menu with an option to post questions. As described in greater detail below in FIG. 9A, the client device 301a associated with presenters 306a may display the plurality of question messages received from the non-presenters 306b-306n, and may display an interaction menu comprising an option to answer these questions. The questions posted by the users 306b-306n may be processed and grouped by the server 315 prior to being displayed at the client device 301a associated with the presenter 306a.

Figure 4:
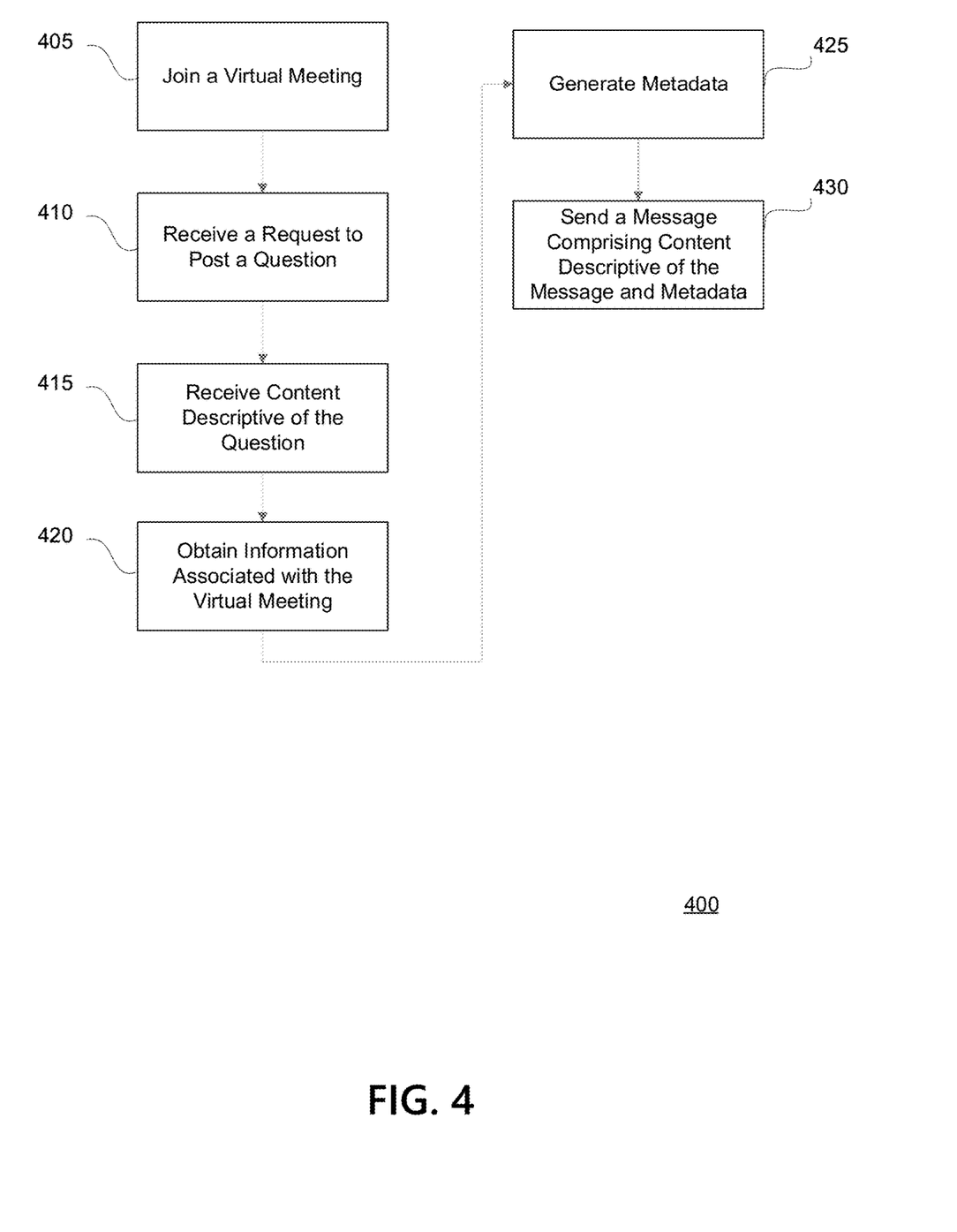
FIG. 4 depicts a flow diagram of an example method for generating question messages that facilitates grouping questions in accordance with one or more illustrative aspects described herein.

FIG. 4 depicts a flow diagram of an example method 400 for generating question messages that facilitates grouping questions as described herein. Some or all of the steps of method 400 may be performed using a system that comprises one or more computing devices as described herein, including, for example, computing devices in FIGS. 1-3. One or more steps of the example, the method may be rearranged, omitted, and/or otherwise modified, and/or other steps may be added.

At step 405, a plurality of client devices 301a-301n may join a virtual meeting. For example, a user 306 of a client device 301 may click a uniform resource locator (URL) link displayed on the client device 301 to join the meeting. The client device 301 may receive input data from the user 306 throughout the virtual meeting, so that the user 306 may interact with other participants of the virtual meeting. The input data may be sent to the server 315 for further processing and then sent to one or more of the plurality of client devices 301a-301n for output.

The system may determine the role of each user 306 (e.g., determine whether the user 306 is a presenter 306a or a non-presenter 306b-306n). For example, the user 306 may log in to a user account before joining the meeting. The system may determine, based on a map between user accounts and the roles, whether the user 306 is a presenter 306a or a non-presenter 306b-306n. Alternatively or additionally, the system may determine a user 306 is a presenter 306a based on the user 306's input. For example, if the user 306, via the client device 301, selects to share the user 306's screen with others, the user 306 may become a presenter 301a.

Figure 6A:
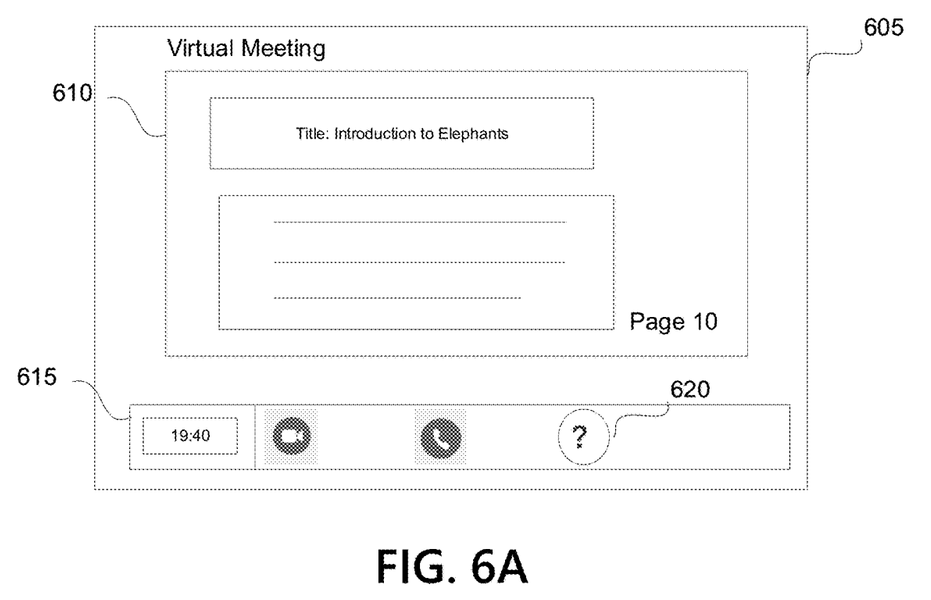
FIGS. 6A and 6B depict illustrative user interfaces for users to pose questions in accordance with one or more illustrative aspects described herein.
Figure 6B:
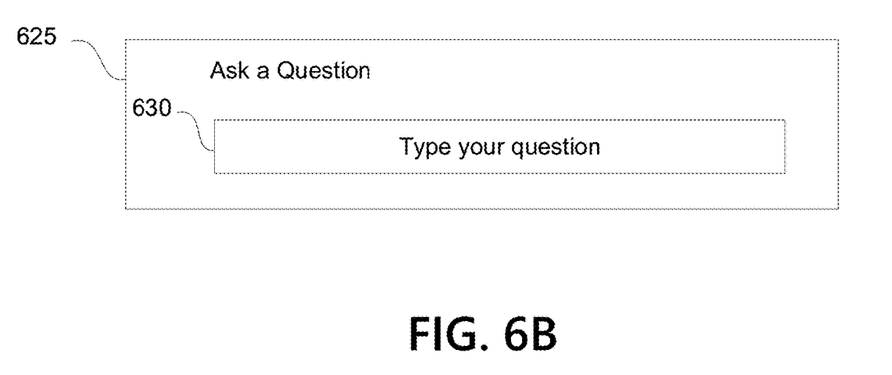

At step 410, a client device 301 may receive a request from the user 306 to post a question. FIG. 6A depicts an example user interface 605 that may be displayed on the client device 301. The interface 605 may comprise a first portion that may display the content of the virtual meeting 610, and a second portion that may display an interaction menu 615 comprising a plurality of icons. Each icon may be associated with an interactive function associated with the virtual meeting. As may be shown in FIG. 6A, the content of virtual meeting 610 may comprise a portion of a document the presenter 301a presents. The content of virtual meeting 610 may also comprise a live video associated with the presenter 301a. The interaction menu 615 may comprise a question icon 620 that may allow the user 306 to request to post a question associated with the virtual meeting. FIG. 6B depicts a dialog window 625 that may be displayed to the user 306 after the user 306 clicks the question icon 620. The dialog window 625 may allow the user 306 to type a question in a text window 630. The dialog window 625 may also allow the user 306 to post a question by other approaches (e.g., by speaking the question to a microphone).

At step 415, the client device 301 may receive the content descriptive of the question. The content may be a text input, an audio input, or any other type of input that the user 306 may use to describe his question.

For example, a professor is holding an online lecture introducing different kinds of animals. At 19:40, the professor may be presenting page 10 of a PowerPoint™ document titled "Introduction to Elephants" while he discusses the relevant topic of elephants. The content of the virtual meeting 610 may comprise that page. Additionally or alternatively, the content of the virtual meeting 610 may comprise a live video of the professor writing on a classroom board near the professor. At 19:50, the professor may talk about a particular habit of elephants. The student John may come up with a question. For example, he may want to know more about why elephants have that habit. However, due to the large number of students participating in the lecture, he may not be allowed to interrupt the professor's lecture by directly asking the question. Instead, he may click the question icon 620 displayed on his client device 301 to request to post a question. He may type in the question window 630 of the content descriptive of his question as "why does an elephant do that?", and then press "Enter."

At step 420, the system may obtain information associated with the virtual meeting while the question is posted. The system may record the time when the request to post a question is received by the client device 301, and/or the time when the content descriptive of the question is received. The time may be recorded as a timestamp. Both of these time points may be useful because there may be a significant time period (e.g., 5 minutes) from the time the user 306 clicks the question icon 620 to the time the user 306 completes the description of the question. During the time period, new contents presented in the virtual meeting may provide the user 306 new contexts and the user 306 may adjust the description of his question based on the new contents.

The system may record any other information associated with the virtual meeting while the question is posted. For example, the system may obtain information representing the content being presented or shared within the meeting. The information may include an image. For example, the client device 301 may take a screenshot comprising the content of the virtual meeting 610 displayed on the user interface 605 of the client device 301. The information may include a transcript during a time period while the user 306 posts the question. For example, the client device 301 may start a voice recording once the user 306 requests to post the question. Or the client device 301 may retrieve, from a storage location, a voice recording a certain time before the user 306 requests to post the question. The voice recording may end at a certain time point after the user 306 completes the description of the question. The voice recording may be converted to a transcript, and the transcript saved in addition to or instead of the voice recording. The system may also record the location (e.g., page number) of the document presented by the presenter. The information may be useful to provide a context of the question. For example, a transcript of the professor introducing the elephant's particular habit may be useful to help the professor understand the question "why does an elephant do that?" without the need of the student to write a description noting what the elephant's behavior the student refers to. This may be particularly helpful if the professor reviews the question at the end of the meeting and may have forgotten what habits he talked about at the time the student asked the question.

At step 425, the client device 301 may generate metadata associated with the question. The metadata may comprise any information obtained at step 420. The metadata may also comprise data identifying the information obtained at step 420 (e.g., a URL link associated with a storage location that stores the information).

At step 430, the client device 301 may send a message comprising the metadata and content descriptive of the question to the server 315. The server 315 may process the message as described in greater detail in FIG. 5 below.

Figure 5:
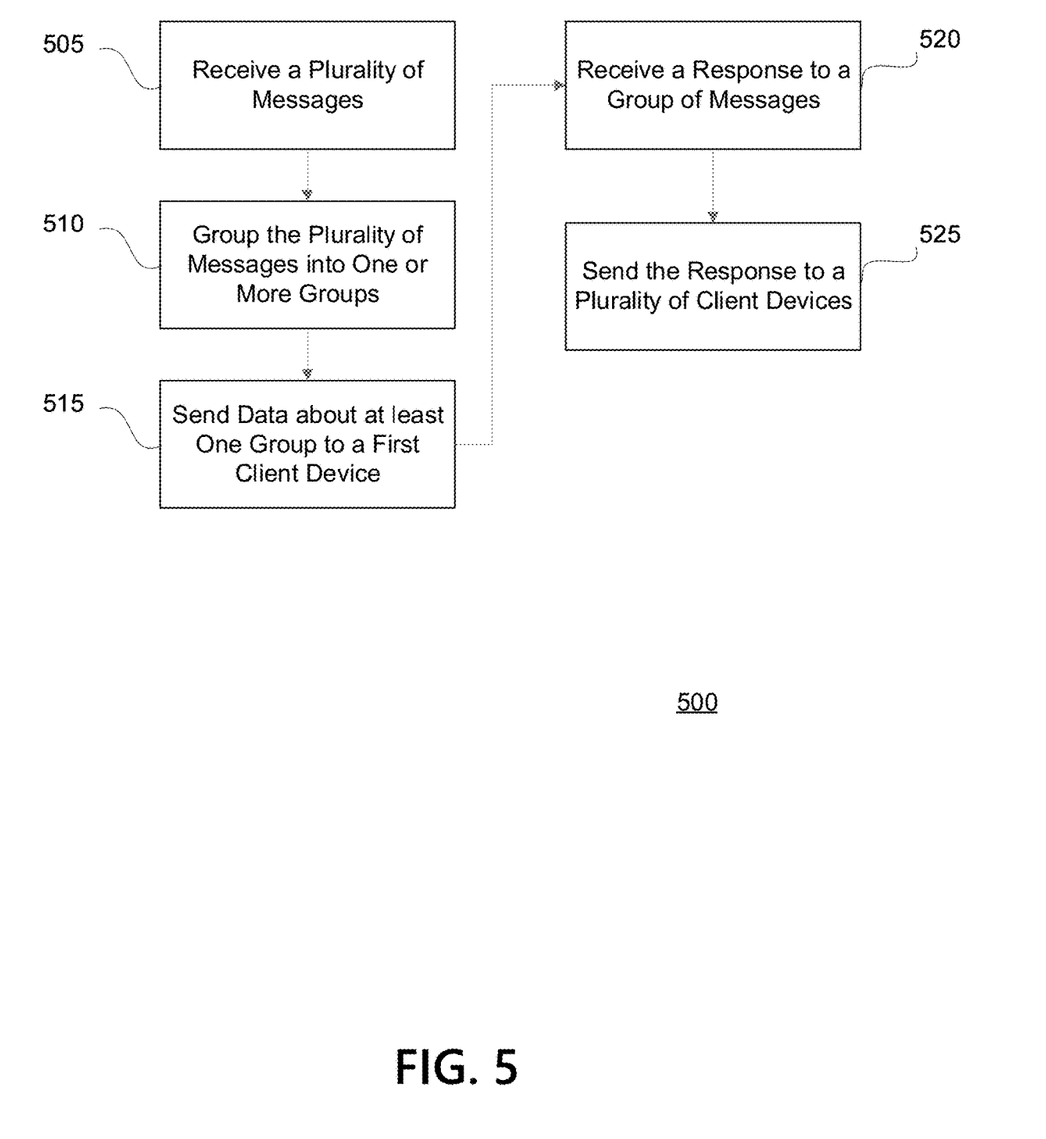
FIG. 5 depicts a flow diagram of an example method for grouping questions in accordance with one or more illustrative aspects described herein.

FIG. 5 depicts a flow diagram of an example method 500 for grouping questions. Some or all of the steps of method 500 may be performed using a system that comprises one or more computing devices as described herein, including, for example, computing devices in FIGS. 1-3. One or more steps of the example, the method may be rearranged, omitted, and/or otherwise modified, and/or other steps may be added.

At step 505, the system (e.g., the server 315) may receive a plurality of messages during a virtual meeting. The virtual meeting may be a virtual meeting described with reference to FIG. 4. The plurality of messages may each indicative of a question. A message may comprise content descriptive of the question and metadata associated with the virtual meeting based on a time of the message. For example, a message of the plurality of messages may be a message sent from one of the client devices 301b-301n to the server 315 as described with reference to in FIG. 4. The metadata may comprise any metadata described with reference to in FIG. 4. For example, the metadata may comprise a timestamp within the virtual meeting corresponding to when that message was started and/or sent, data identifying an image corresponding to the message (e.g., the image represents content being presented within the virtual meeting), a transcript of a presenter during a time period comprising a time corresponding to at least one of the one or more timestamps, and/or a number or other identifier indicative of a location of a document presented during the virtual meeting at the time of the question.

Figure 7:
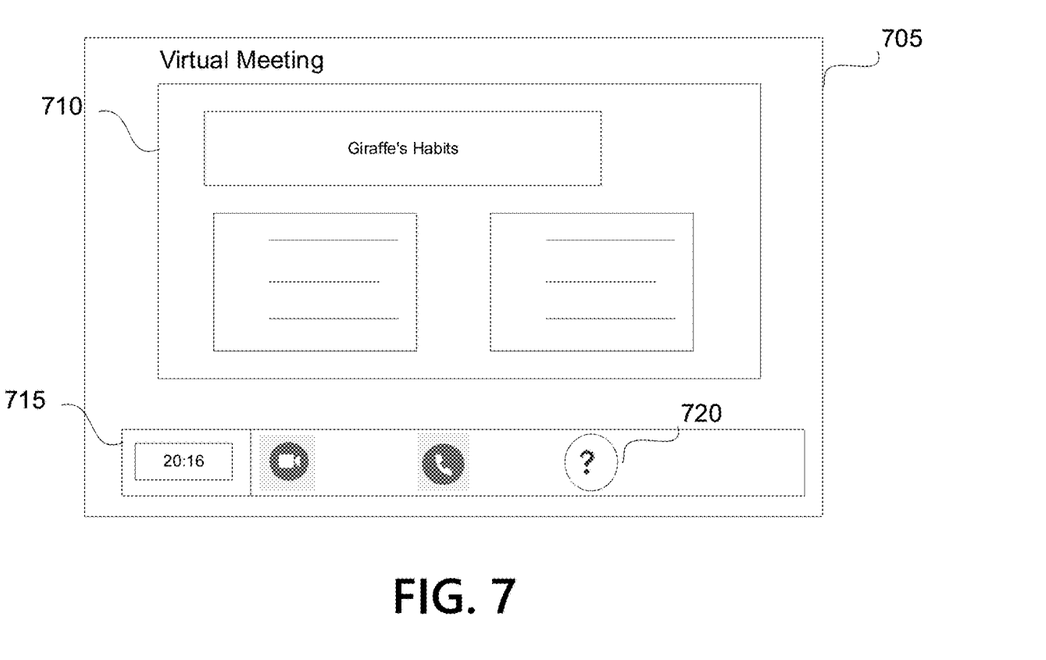
FIG. 7 depicts another illustrative user interface for users to pose questions in accordance with one or more illustrative aspects described herein.
Figure 8:
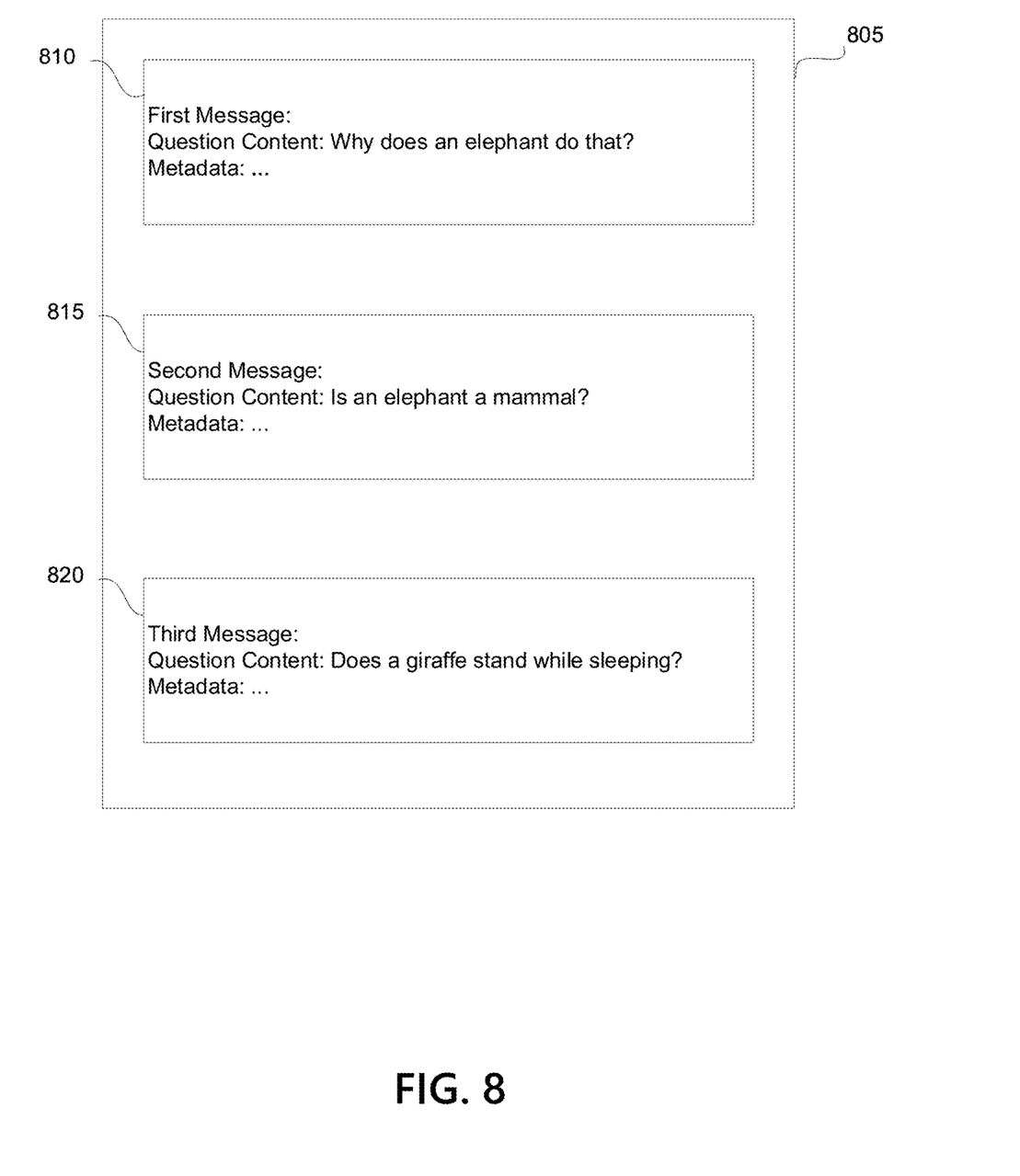
FIG. 8 depicts an exemplary list of a plurality of question messages in accordance with one or more illustrative aspects described herein.

As one example, FIG. 8 depicts a plurality of messages received by the server 315 during a virtual meeting. The list of the plurality of messages 805 may show three messages (e.g., the first message 810, the second message 815, and the third message 820). But any number of messages is possible. Consistent with the lecture example described with reference to FIG. 4, a first message 810 may comprise content descriptive of a first question posted by student John as "why does an elephant do that?" via a first client device 301b during a time period while the professor was presenting page 10 of his PowerPoint™ document. A second message 815 may comprise content descriptive of a second question posted by a second student while the professor was presenting the same page of the PowerPoint™ document. The content descriptive of the second question may be "is an elephant a mammal?". The second message may be received via a second client device 301c. A third message 820 may comprise content descriptive of a third question posted by a third student while the professor was presenting another page of the PowerPoint™ document. For example, as depicted in FIG. 7, the third question may be posted by a third client device 301d. The user interface 705 displayed on the third client device 301d may comprise a portion displaying the content of the virtual meeting 710 at 20:16. The professor, at that time, may be talking about the habits of giraffes. The third question may be "does a giraffe stand while sleeping?".

At step 510, the system may group the plurality of messages into one or more groups by analyzing the content and metadata of each message, wherein individual messages within each group have a context in common with one another.

The context in common may be a discussion topic corresponding to the virtual meeting. Consistent with the example depicted in FIG. 8, the system may group the first message 810 and the second message 815 into one group, and may group the third message 820 into another group. This grouping may be based on the first message 810 and the second message 815 having the common context corresponding to the discussion of elephants, while the third message 820 may correspond to the discussion of giraffe, and therefore may have a different context from the first message 810 and the second message 815.

The grouping may be based on analyzing the text and metadata of the messages. As described above, the metadata may comprise any information associated with the virtual meeting while the question is posted. For example, the metadata may comprise one or more timestamps within the virtual meeting corresponding to when that message was started and/or sent, data identifying an image corresponding to the message (e.g., the image represents content being presented within the virtual meeting), a transcript of a presenter during a time period comprising a time corresponding to at least one of the one or more timestamps, and/or an indication of a location of a document presented during the virtual meeting.

If the metadata comprises data identifying an image corresponding to the message (e.g., the image represents content being presented within the virtual meeting), the system may determine a level of similarity between two or more images identified in the metadata of the plurality of messages. If the level of similarity between two or more images reaches a threshold, the system may group messages corresponding to the two or more images into one group. Consistent with the lecture example above, a first image associated with the first message 810 may be a screenshot taken while the first question is posted. At least a portion of the first image may be similar to the content of the virtual meeting 610 displayed on the user interface 605. A second image associated with the second message 815 may be a screenshot taken while the second question is posted. At least a portion of the second image may also be similar to the content of the virtual meeting 610 displayed on the user interface 605, because, as discussed above, the second question may also be posted while the professor presented the "introduction to elephants" page of the PowerPoint™. Therefore, the system may determine the level of similarity between the first image and the second image is high. By contrast, a third image associated with the third message 820 may be a screenshot taken while the third question is posted. At least a portion of the third image may be similar to the content of the virtual meeting 710 displayed on the user interface 705, because the third question may be posted while the professor presented the document page titled "Giraffe's Habits," as may be described in FIG. 7. The system may determine that the level of similarity between the third image and either one of the first image and the second image is low. Based on the determination, the system may group the first and the second message as one group, and may group the third message into another group.

While determining the level of similarity, the system may use a portion of an image and ignore the other portion of the image. For example, if the professor, instead of presenting a PowerPoint™ document, presents a live video showing himself standing in front of a classroom board and writing on the board while he lectures, the system may use the portion of images showing the board but ignore the portion of images showing the professor. This may because the content written on the classroom board may be more relevant to whether the discussions may have a context in common, while the position of the professor may less relevant. For example, the professor may walk from the left side to the right side of the screen while talking about the same topic, but the content on the classroom board may remain similar. By contrast, the professor may stand in the same location with largely the same posture while he talks about two separate topics, but the contents on the classroom board may be different.

Additionally or alternatively, the system may determine a level of similarity of the image associated with the message and one of a plurality of images pre-stored in a database. For example, if a PowerPoint™ document has been uploaded to the database, the system may compare the screenshot associated with a message with each page of the PowerPoint™ document. Messages associated with an image similar to one or more pages of the document in the database may be grouped into one group.

The level of similarity may be determined by a machine learning model using artificial intelligence technology. The level of similarity may also be determined using fussy logic. It will be appreciated that various ways to determine the filters are contemplated herein and will become apparent to a person having ordinary skill in the art with the benefit of this disclosure.

If the metadata comprises a transcript of a presenter during a time period comprising a time corresponding to at least one of the one or more of the timestamps, the system may determine the level of similarity between two or more transcripts corresponding to the messages. If the level of similarity between two or more transcripts reaches a threshold, the system may group messages corresponding to the two or more transcripts into one group.

If the metadata comprises a timestamp within the virtual meeting corresponding to when that message was started and/or sent, the system may group messages based on the time proximity of the timestamps corresponds to each message, because questions posted in temporal proximity may have a common context.

If the metadata comprises an indication of the location of the document presented during the meeting, the system may group messages corresponding to a certain portion of the document (e.g., one or more pages of the document) into one group.

The system may extract one or more keywords from the content descriptive of a question, and then determine a level of similarity between the one or more keywords extracted from each message with one or more keywords extracted from other messages in the plurality of messages. Consistent with the lecture example depicted in FIG. 8, the first message 810 and the second message 815 may both have the common keyword "elephant," while the third message 820 may not have a similar keyword.

The system may also group messages into one group based on a combination of any one or more of the examples described above. By grouping messages having a common context as one group, the presenter 306a may be able to answer related questions together and therefore improve the efficiency of answering questions.

At step 515, the system may send data about at least one group to a first client device 301a for output of the questions indicated by the messages of that group on the first client device 301a. The data may comprise an image representative of the context shared among different messages of the group.

Figure 9A:
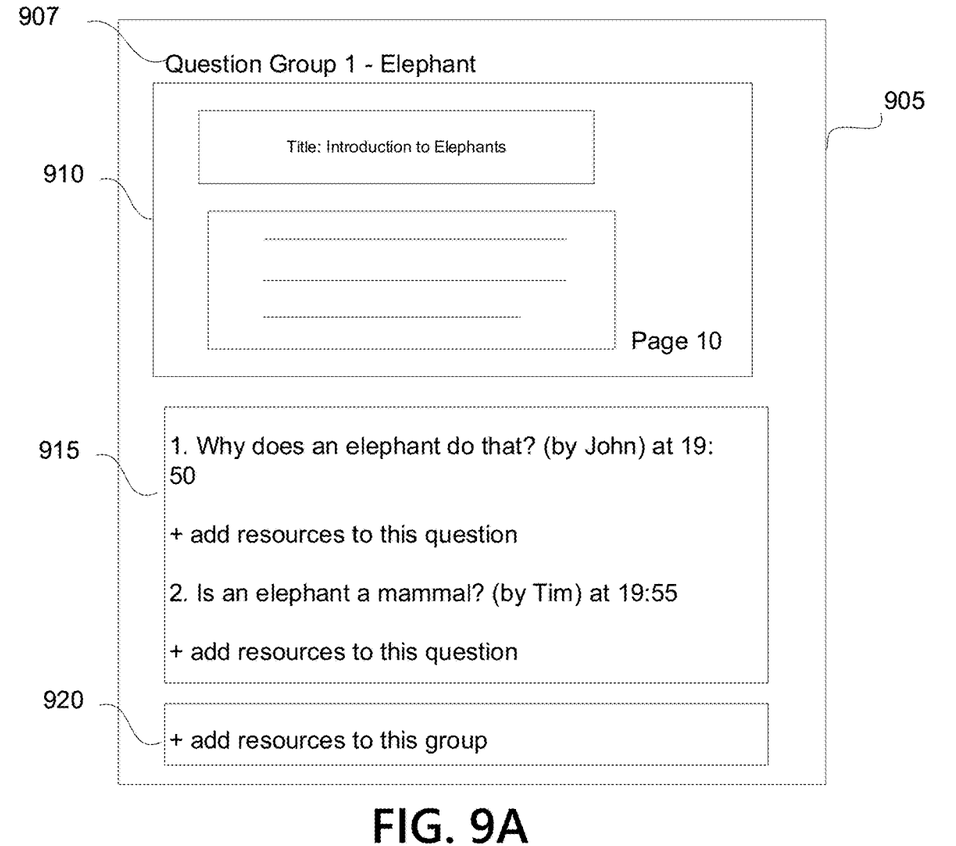
FIGS. 9A and 9B depict illustrative user interfaces for presenting questions that are grouped into one group in accordance with one or more illustrative aspects described herein.

FIG. 9A depicts a user interface 905 on the first device 301a after the data is output on the first device 301a. The user interface 905 may show a description 907 of the common context shared by the messages. Consistent with the lecture example, description 907 may be "Question Group 1—Elephant." The user interface 905 may also comprise an image 910 representative of the context shared among different messages of the group. For example, the image 910 may comprise the page of the document that was presented during the time period while the first question and the second question were posted. The image 910 may be obtained by the server 315 from the metadata of either the first message 810 or the second message 815, which may comprise a screenshot taken when the question was posted. Alternatively, if the document presented in the meeting has been uploaded to a database communicating with the server 315, the server 315 may identify the page number of the document and then obtain the image 910 from the database based on the page number. If the presenter presents a live video (e.g., a live video showing himself standing in front of a classroom board) during the meeting, the image 910 may be at least a portion of the screenshot taken when either the first question or the second question was posted.

The user interface 905 may also comprise a question content window 915 displaying the questions indicated by the messages of the group, as well as other relevant information to the questions. For example, the question content window 915 may display the first question associated with the first message 810, "why does an elephant do that? (by John) at 19:50." The question content window 915 may also display the second question associated with the second message 815, "Is an elephant a mammal? (by Tim) at 19:55." Next to each of the questions, there may be an option to "add resources to this question." If the presenter clicks that option, he may be able to answer the question by typing information or uploading documents.

The user interface 905 may also comprise an answering option 920 displaying an option to "add resources to this group." If the presenter 306*a* clicks that answering option 920, the presenter 306*a* may be able to type answers or upload documents relevant to the group (e.g., providing information relevant to the common context of elephants). For example, the professor may upload a document called "more information about elephants" that answers both the first question and the second question.

Turning back to FIG. 5, at step 520, the server 315 may receive a response to a group of messages from the presenter 306*a*. For example, the response may be the "more information about elephants" document uploaded by the professor via the first client device 301*a*.

Figure 9B:
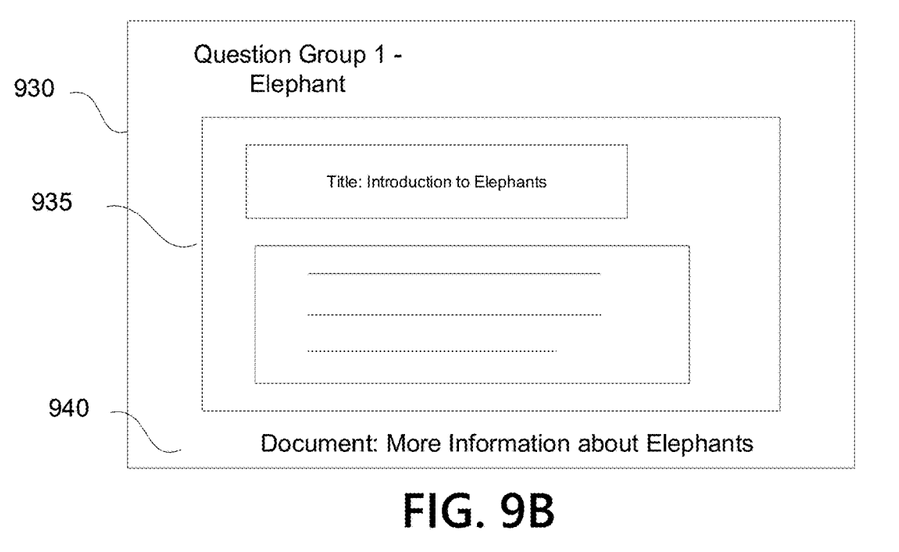

As step 525, the server 315 may send the response to a plurality of client devices 301*b*-301*n* for output. The plurality of client devices 301*b*-301*n* may comprise all client devices from which at least one of the messages within the group originated. FIG. 9B depicts an user interface 930 that displays the response on one of the plurality of client devices 301*b*-301*n*. The user interface 930 may comprise an image 935 representative of the shared context of the group. For example, the image 935 may be the image 910 depicted in FIG. 9A. The user interface 930 may comprise a response content 940. For example, as may be shown in FIG. 9B, the response content 940 may be a link to the document the professor uploaded.

The user interface 930 may be displayed in a display window separate from the content of the virtual meeting. For example, when the presenter adds the response, the presenter may be talking about another unrelated topic and may not want to interrupt that current topic. Therefore, the professor may choose to display the interface 930 as a separate window so that users 306 who are interested may be able to see it. Additionally or alternatively, the user interface 930 may be displayed as the content presented in the virtual meeting. For example, if the presenter 306*a* believes answering the group of questions is important, he may present the user interface 930 so that he could address the group of questions with the help of the image 935 and response content 940.

The following paragraphs (M1) through (M11) describe examples of methods that may be implemented in accordance with the present disclosure.

(M1) A method comprising: receiving, by a server and during a virtual meeting, a plurality of messages each indicative of a question, and wherein the message comprises content descriptive of the question and metadata associated with the virtual meeting based on a time of the message; grouping the plurality of messages into one or more groups by analyzing the content and metadata of each message, wherein individual messages within each group has a context in common with one another; and sending data about at least one group to a first client device for output of the questions indicated by the messages of that group on the first client device.

(M2) A method may be performed as described in paragraph (M1) wherein the metadata of each individual message comprises one or more timestamps within the virtual meeting corresponding to when that message was started and/or sent.

(M3) A method may be performed as described in any of paragraphs (M1) through (M2) wherein the metadata of one or more individual messages comprises data identifying an image corresponding to that message.

(M4) A method may be performed as described in paragraph (M3) wherein the image represents content being presented within the virtual meeting.

(M5) A method may be performed as described in any of paragraphs (M3) through (M4) wherein analyzing the content and metadata of the message comprises determining a level of similarity between two or more images identified in the metadata of the plurality of messages.

(M6) A method may be performed as described in any of paragraphs (M2) through (M5) wherein the metadata comprises a transcript of a presenter during a time period comprising a time corresponding to the one or more timestamps.

(M7) A method may be performed as described in paragraph (M6) further comprising: obtaining, a voice recording around the time with which the question message is associated; and converting, the voice recording to the transcript.

(M8) A method may be performed as described in any of paragraphs (M1) through (M7) wherein the metadata comprises a number indicative of a location of a document presented during the virtual meeting.

(M9) A method may be performed as described in any of paragraphs (M1) through (M8) wherein analyzing the content and metadata of the message comprises: extracting one or more keywords from the content; and determining a level of similarity between the one or more keywords extracted from each message with one or more keywords extracted from other messages in the plurality of messages.

(M10) A method may be performed as described in any of paragraphs (M1) through (M9) wherein the data about the at least one group comprises an image representative of the context shared among different messages of the group.

(M11) A method may be performed as described in any of paragraphs (M1) through (M10) further comprising: receiving, from the first client device, a response to a group of messages; and sending the response to a plurality of client devices for output, wherein the plurality of client devices comprises all client devices from which at least one of the messages within the group originated.

The following paragraphs (A1) through (A8) describe examples of apparatuses that may be implemented in accordance with the present disclosure.

A computing device comprising: at least one processor; memory configured to store computer-readable instructions that, when executed by the at least one processor, cause the computing device to: receive, by a server and during a virtual meeting, a plurality of messages each indicative of a question, and wherein the message comprises content descriptive of the question and metadata associated with the virtual meeting based on a time of the message; group the plurality of messages into one or more groups by analyzing the content and metadata of each message, wherein individual messages within each group has a context in common with one another; and send data about at least one group to a first client device for output of the questions indicated by the messages of that group on the first client device.

(A2) A computing device as described in paragraph (A1), wherein the metadata of each individual message comprises one or more timestamps within the virtual meeting corresponding to when that message was started and/or sent.

(A3) A computing device as described in any of paragraphs (A1) through (A2), wherein the metadata of one or more individual messages comprises data identifying an image corresponding to that message.

(A4) A computing device as described in paragraphs (A3), wherein the data about the at least one group comprises an image representative of the context shared among different messages of the group.

(A5) A computing device as described in paragraphs (A4), wherein the computer-readable instructions are configured to cause the computing device to analyze the content and metadata of the message by determining a level of similarity between two or more images identified in metadata of the plurality of messages.

(A6) A computing device as described in any of paragraphs (A1) through (A5), wherein the computer-readable instructions are configured to cause the computing device to analyze the content and metadata of the message by performing actions comprising: extracting one or more keywords from the content; and determining a level of similarity between the one or more keywords extracted from each message with one or more keywords extracted from other messages in the plurality of messages.

(A7) A computing device as described in paragraph (A2), wherein the metadata comprises a transcript of a presenter during a time period comprising a time corresponding to the one or more timestamps.

(A8) A computing device as described in any of paragraphs (A1) through (A7), wherein the computer-readable instructions are further configured to cause the computing device to: receive, from the first client device, a response to a group of messages; and send the response to a plurality of client devices for output, wherein the plurality of client devices comprises all client devices from which at least one of the messages within the group originated.

The following paragraph (CRM1) describes examples of computer-readable media that may be implemented in accordance with the present disclosure.

(CRM1) A non-transitory computer-readable medium storing instructions that, when executed by a computing device comprising at least one processor, a communication interface, and memory, cause the computing device to: receive, during a virtual meeting, a plurality of messages each indicative of a question, and wherein the message comprises content descriptive of the question and metadata associated with the virtual meeting based on a time of the message; group the plurality of messages into one or more groups by analyzing the content and metadata of each message, wherein individual messages within each group has a context in common with one another; and send data about at least one group to a first client device for output of the questions indicated by the messages of that group on the first client device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a server and during a virtual meeting, a plurality of messages each indicative of a question, wherein each of the plurality of messages comprises content descriptive of the respective question and metadata associated with a time period during the virtual meeting while the respective question is posted, wherein each of the plurality of messages is received from a respective client device associated with a non-presenter user, and wherein the metadata comprises a transcript of a presenter during the time period while the respective question is posted;
grouping the plurality of messages into one or more groups by analyzing the content and the metadata of each message, wherein the grouping is based on:
individual messages within each group having a context in common with one another; and
individual messages within each group being associated with a common time period during the virtual meeting; and
sending data about at least one group to a first client device for output of the questions indicated by the messages of that group on the first client device.

2. The method of claim 1, wherein the metadata of one or more individual messages comprises data identifying an image corresponding to that message.

3. The method of claim 2, wherein the image represents content being presented within the virtual meeting.

4. The method of claim 2, wherein analyzing the content and metadata of the message comprises determining a level of similarity between two or more images identified in the metadata of the plurality of messages.

5. The method of claim 1, further comprising:
obtaining, a voice recording around the time with which the question message is associated, wherein the voice recording records audio received from a second client device associated with the presenter of the virtual meeting; and
converting, the voice recording to the transcript.

6. The method of claim 1, wherein the metadata comprises a number indicative of a location of a document presented during the virtual meeting.

7. The method of claim 1, wherein analyzing the content and metadata of the message comprises:
extracting one or more keywords from the content; and
determining a level of similarity between the one or more keywords extracted from each message with one or more keywords extracted from other messages in the plurality of messages.

8. The method of claim 1, wherein the data about the at least one group comprises an image representative of the context shared among different messages of the group.

9. The method of claim 1, further comprising:
receiving, from the first client device, a response to a group of messages; and
sending the response to a plurality of client devices for output, wherein the plurality of client devices comprises all client devices from which at least one of the messages within the group originated.

10. A computing device, comprising:
at least one processor;
memory configured to store computer-readable instructions that, when executed by the at least one processor, cause the computing device to:
receive, during a virtual meeting, a plurality of messages each indicative of a question, wherein each of the plurality of messages comprises content descriptive of the question and metadata associated with a time period during the virtual meeting while the respective question is posted, wherein each of the plurality of messages is received from a respective client device associated with a non-presenter user, and wherein the metadata comprises a transcript of a presenter during the time period while the respective question is posted;

group the plurality of messages into one or more groups by analyzing the content and the metadata of each message, wherein the grouping is based on:
individual messages within each group having a context in common with one another; and
individual messages within each group being associated with a common time period during the virtual meeting; and send data about at least one group to a first client device for output of the questions indicated by the messages of that group on the first client device.

11. The computing device of claim 10, wherein the metadata of one or more individual messages comprises data identifying an image corresponding to that message.

12. The computing device of claim 11, wherein the data about the at least one group comprises an image representative of the context shared among different messages of the group.

13. The computing device of claim 12, wherein the computer-readable instructions are configured to cause the computing device to analyze the content and metadata of the message by determining a level of similarity between two or more images identified in metadata of the plurality of messages.

14. The computing device of claim 10, wherein the computer-readable instructions are configured to cause the computing device to analyze the content and metadata of the message by performing actions comprising:
extracting one or more keywords from the content; and
determining a level of similarity between the one or more keywords extracted from each message with one or more keywords extracted from other messages in the plurality of messages.

15. The computing device of claim 10, wherein the computer-readable instructions are further configured to cause the computing device to:
receive, from the first client device, a response to a group of messages; and
send the response to a plurality of client devices for output, wherein the plurality of client devices comprises all client devices from which at least one of the messages within the group originated.

16. One or more non-transitory computer-readable media storing instructions that, when executed by a computing device comprising at least one processor, a communication interface, and memory, cause the computing device to:
receive, during a virtual meeting, a plurality of messages each indicative of a question, wherein each of the plurality of messages comprises content descriptive of the question and the metadata associated with a time period during the virtual meeting while the respective question is posted, wherein each of the plurality of messages is received from a respective client device associated with a non-presenter user, and wherein the metadata comprises a transcript of a presenter during the time period while the respective question is posted;
group the plurality of messages into one or more groups by analyzing the content and metadata of each message, wherein the grouping is based on:
individual messages within each group having a context in common with one another; and
individual messages within each group being associated with a common time period during the virtual meeting; and
send data about at least one group to a first client device for output of the questions indicated by the messages of that group on the first client device.

* * * * *